A. G. PLANCHENAULT.
CLASP.
APPLICATION FILED JUNE 25, 1918.
1,308,446.
Patented July 1, 1919.
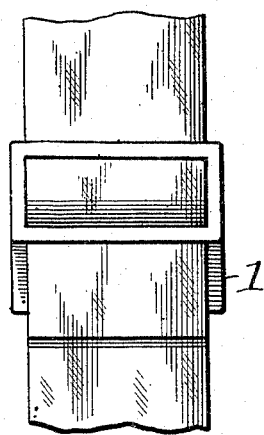
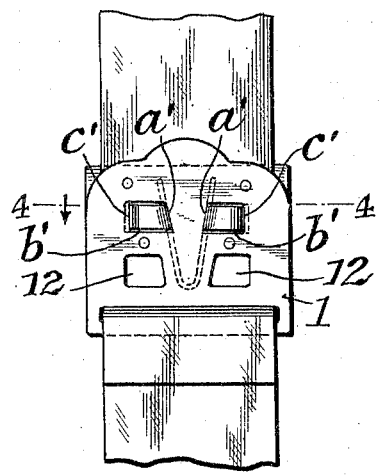
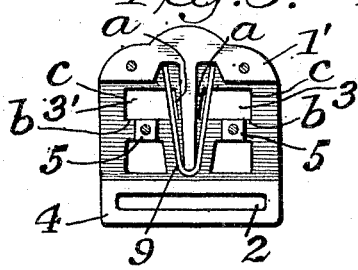  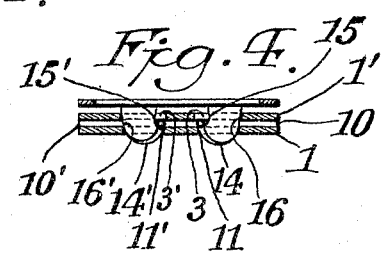
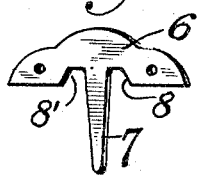 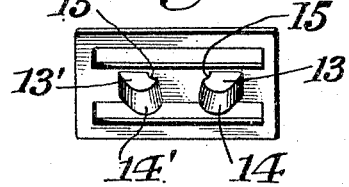
Inventor,
Alexandre G. Planchenault,
By Merwin & Swenarton
His Attorneys.

UNITED STATES PATENT OFFICE.

ALEXANDRE G. PLANCHENAULT, OF COYTESVILLE, NEW JERSEY, ASSIGNOR TO NATIONAL CLASP CO., INC., OF NEW YORK, N. Y., A CORPORATION OF NEW YORK.

CLASP.

1,308,446.  Specification of Letters Patent.  Patented July 1, 1919.

Application filed June 25, 1918. Serial No. 241,739.

*To all whom it may concern:*

Be it known that I, ALEXANDRE G. PLANCHENAULT, a citizen of the Republic of France, and residing in Coytesville, county of Bergen, and State of New Jersey, have invented new and useful Improvements in Clasps, of which the following is a specification:

This invention relates to clasps which are particularly adapted for jewelry, garments and the like and has for its objects the provision of a simple, effective and cheap construction which is both durable and attractive in appearance.

I am aware that heretofore various clasps, for example as shown in Patent No. 417,124 of December 10, 1889, and my Patent No. 1,246,654 of November 13, 1917, have been proposed, but the employment of retractile plungers such as shown in both of such constructions is objectionable, particularly in those cases where durability and economy are essential features, owing obviously to the extra parts which are required with the consequent likelihood of derangement as well as the extra expense of labor and material. Accordingly, I do not broadly lay claim to such constructions.

My invention is fully set forth and described in the accompanying specification and drawings forming a part thereof, in which—

Figure 1 is a bottom plan view of a belt provided with my improved clasp;

Fig. 2 is a top plan view of the same;

Fig. 3 is a plan view of one member of the clasp, isolated, with the top plate removed; Fig. 3ª is a side elevation, before soldering, of the same member assembled;

Fig. 4 is a transverse vertical section along the line 4—4 of Fig. 2;

Fig. 5 is a perspective view of the retaining pin, isolated;

Fig. 6 is a perspective view of the other member isolated, viewing the same from below.

Referring to the drawings and the construction shown therein, the reference numerals 1, 1' designate the top and bottom plates respectively, of the upper member of the clasp. Each of these members is provided with an elongated transverse slot 2, adapted to receive the end of the belt, strap or the like. The end member 1' is provided with apertures 3, 3', which, as shown, are provided with edges *a* that are oblique to the base *b* and upwardly diverging with respect to each other and edges *c* that are perpendicular to said base. A slotted spacer or slug 4 is interposed between said plates 1 and 1' being secured thereto by soldering or in any other desired manner. Supplemental spacers 5, 5' are also provided, which may be formed integral with the plate, though preferably the same constitute separate inserts. A positioning-member or retaining-pin 6 corresponding in thickness to said spacers and having a centrally projecting tongue or shank 7 and also recesses 8, 8' disposed on either side of said shank, serves as a spacer itself and also to position a V-shaped spring 9, preferably of tempered steel wire and to hold the lower end of said spring against the inner edge of the spacer 4.

The top plate 1 is of similar configuration to the bottom plate 1' and is also provided with a pair of apertures 11, 11' of similar configuration to the apertures 3, 3' and adapted to substantially register therewith, except that the apertures 11, 11' are shorter than the apertures 3, 3' for the reason hereinafter set forth. Said apertures 11, 11' like the apertures 3, 3', have oblique edges *a'* which form angles to the base *b'* similar to that formed by the edges *a* with the base *b*. Also, the edges *c'*, like the edges *c* are perpendicular to the base *b'*. Each of said plates 1 and 1' are also cut away preferably as indicated by the reference numeral 12 in order to save metal.

The coöperating clasp member is provided with lugs 13, 13' which are of such configuration that if presented from the wrong side of the upper member, for the reasons hereinafter explained, it is impossible for them to enter the apertures 3, 3' and 11, 11'. Said configuration consists of curvilinear end faces 14, 14', and curvilinear side faces 15, 15' which latter faces preferably meet the former at a slight obtuse angle, thus forming shoulders under which the free ends of said spring 9 are adapted to project when the said lugs are inserted into the apertures 3, 3' and 11, 11' of the plates 1 and 1'.

The outer faces 16, 16' of said lugs preferably curve continuously outward from the mid-point of the end faces 14, 14' to the respective bases of said lugs, thereby requiring that the apertures 3, 3', be somewhat more elongated than the apertures 11, 11' in order to permit of the convenient insertion of said lugs into said apertures in the manner and position shown in Fig. 4. As a consequence both the edges $a'$ and edges $c'$ of the apertures 11, 11' will snugly engage the inner ends of end faces 14, 14' and the upper ends only of the side faces 16, 16', of the lugs when the latter are so inserted therein, whereas, only the edges $c$ of the apertures 3, 3' will engage with the lower ends of the faces 16, 16' of the enlarged base of said lugs, since the inner faces $a$ of said apertures 3, 3' will, owing to the lugs being cut away, be out of contact with the faces 15, 15' of the said lugs.

The faces 15, 15' of said lugs are also oblique to conform with the angularity of the edges $a$ and $a'$ of the apertures 3, 3' and 11, 11' and consequently, it is impossible to insert the lugs in the apertures 3, 3' when the former are presented backward or in such a manner that the said faces 15, 15' do not lie parallel to the edges $a$ and $a'$. Moreover, owing to the difference in the size of the apertures 3, 3' as compared with the apertures 11, 11' the clasp cannot be properly locked unless the ends of the lugs are inserted first into the apertures 3, 3', as the apertures 11, 11' are too short and hence the proper insertion of said lugs therein is not possible.

This clasp is not only extremely cheap and durable or "fool-proof", but owing to the fact that the outer apertures 11, 11' are adapted to snugly bear against both sides of the end faces of said lugs 13, 13', there is no likelihood of a side thrust or blow on the ends of the lugs causing the same to become accidentally disengaged from the retaining springs. Nevertheless, by prying the two clasp members apart with the finger-nail the same can be positively disengaged at will. As shown, the faces 15, 15' of the lugs are so formed as to force the spring 9 automatically out of engagement with said lugs when the clasp members are positively pried apart, yet, as stated, there is no tendency for said spring 9 to become accidentally released from engagement with said lugs.

The plates 1, 1' are secured together by means of four pins or rivets $e$. Moreover, in order to improve the appearance any openings in the sides of the clasp when assembled are filled in with solder.

Having thus described my invention, what I claim and desire to secure by Letters Patent is:—

1. A clasp consisting of two members, the first member being provided with a plurality of oppositely disposed lugs having shoulders on their adjacent faces and the second member being provided with apertures each of such configuration as to snugly receive one of said lugs, a spring secured within the latter member and positioned intermediate the respective outermost limits of said apertures, said spring being adapted to normally project beneath the said shoulders when said lugs are inserted in said apertures, and the configuration of the inner face of said lugs being such as to automatically compress the respective arms of said spring and permit the release of said lugs from engagement with said arms when said members are forced apart by pressure exerted substantially axially of said lugs and positioning means projected substantially between said apertures and adapted to securely hold said spring so that its respective arms project slightly over the inner edges of said apertures after the assembly of the parts of said second member.

2. In a clasp of the character described in claim 1, a pair of oppositely disposed lugs having convex ends and concave adjacent faces with shoulders at their intersections.

3. In a clasp of the character described in claim 1, a pair of oppositely disposed lugs having convex ends and concave adjacent faces with shoulders at their intersections, the outer face of the convex end of each lug intersecting such inner face at an obtuse angle.

4. In a clasp the combination comprising a socket member and a stud member, said socket member having apertures extending therethrough and said apertures being larger at the bottom than at the top and said apertures having oblique adjacent edges, said stud member having studs which taper upwardly and which are provided with oblique adjacent faces corresponding in angularity to the oblique edges whereby the same are adapted to be inserted into said apertures from the bottom only.

Signed at New York, in the county of New York and State of New York this 24th day of June, 1918.

ALEXANDRE G. PLANCHENAULT.

Copies of this patent may be obtained for five cents each, by addressing the "Commissioner of Patents, Washington, D. C."